Figure 4:
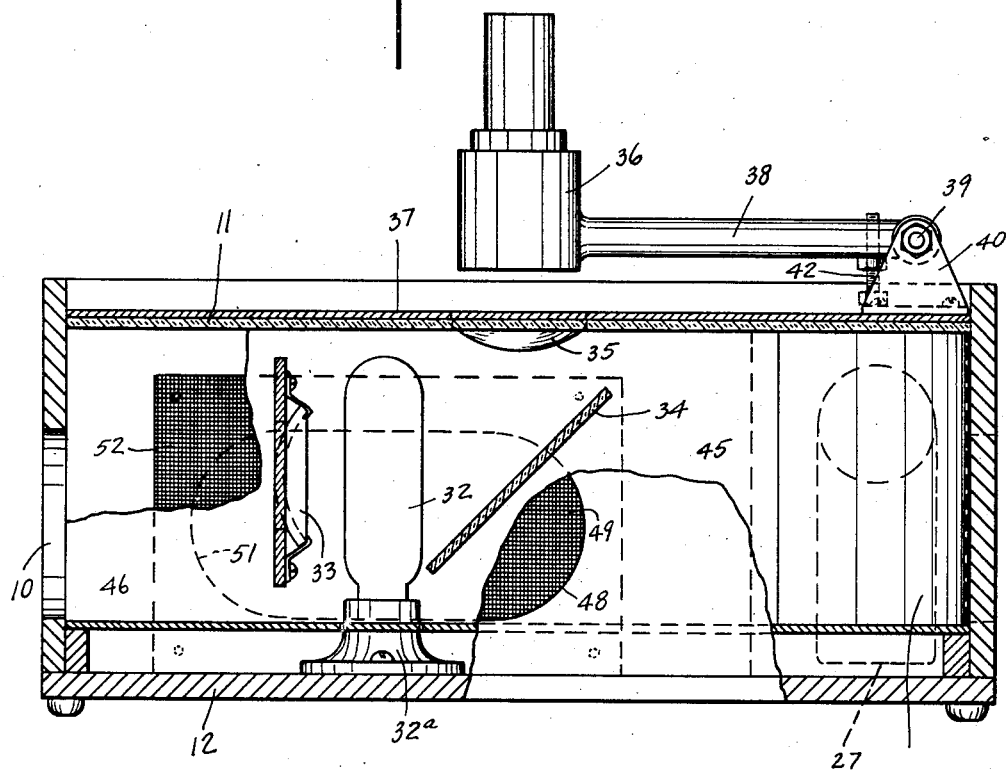

Aug. 13, 1946.  G. E. MUSEBECK ET AL  2,405,706
PICTURE PROJECTOR
Filed May 21, 1943  3 Sheets-Sheet 1
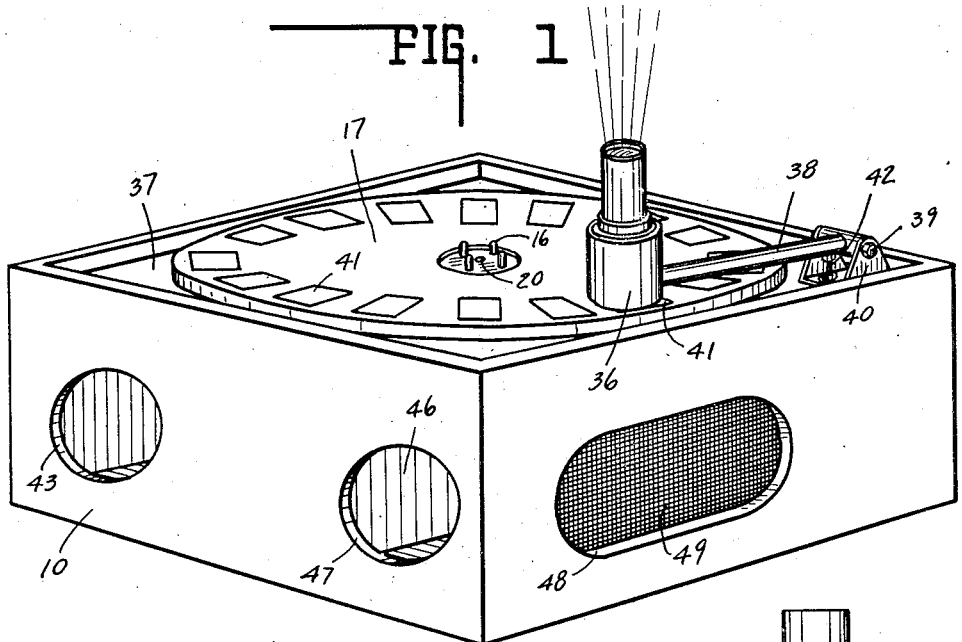
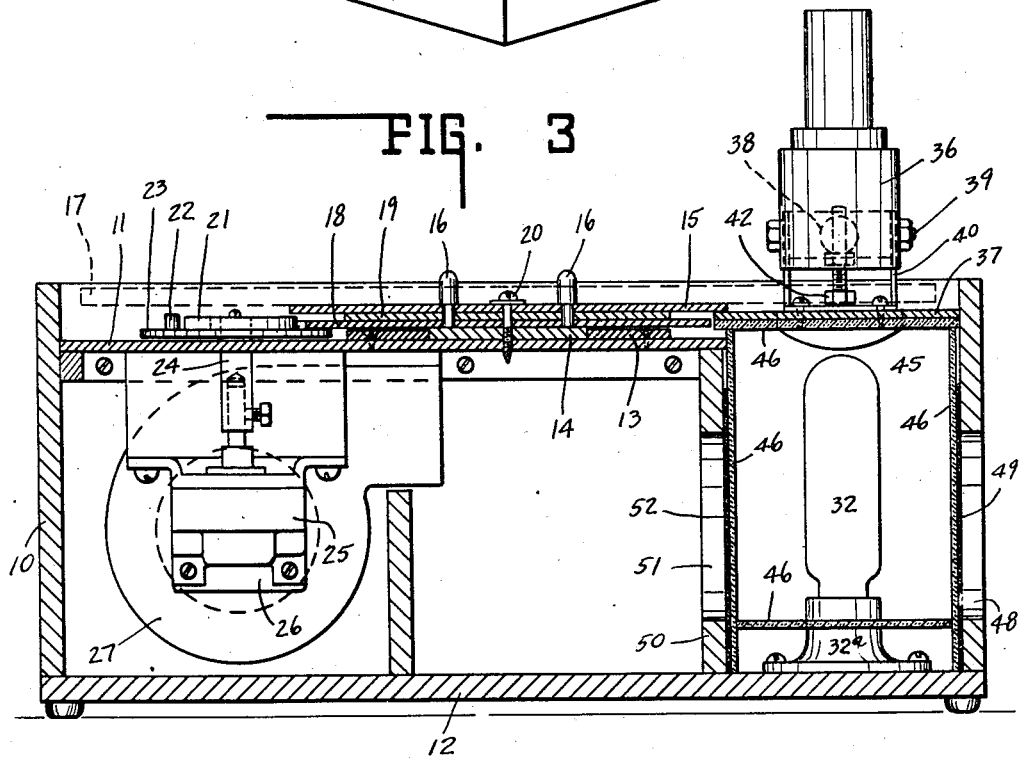
INVENTORS.
GEORGE E. MUSEBECK.
FRANK P. BENNETT.
BY
Lockwood Goldsmith & Galt,
ATTORNEYS.

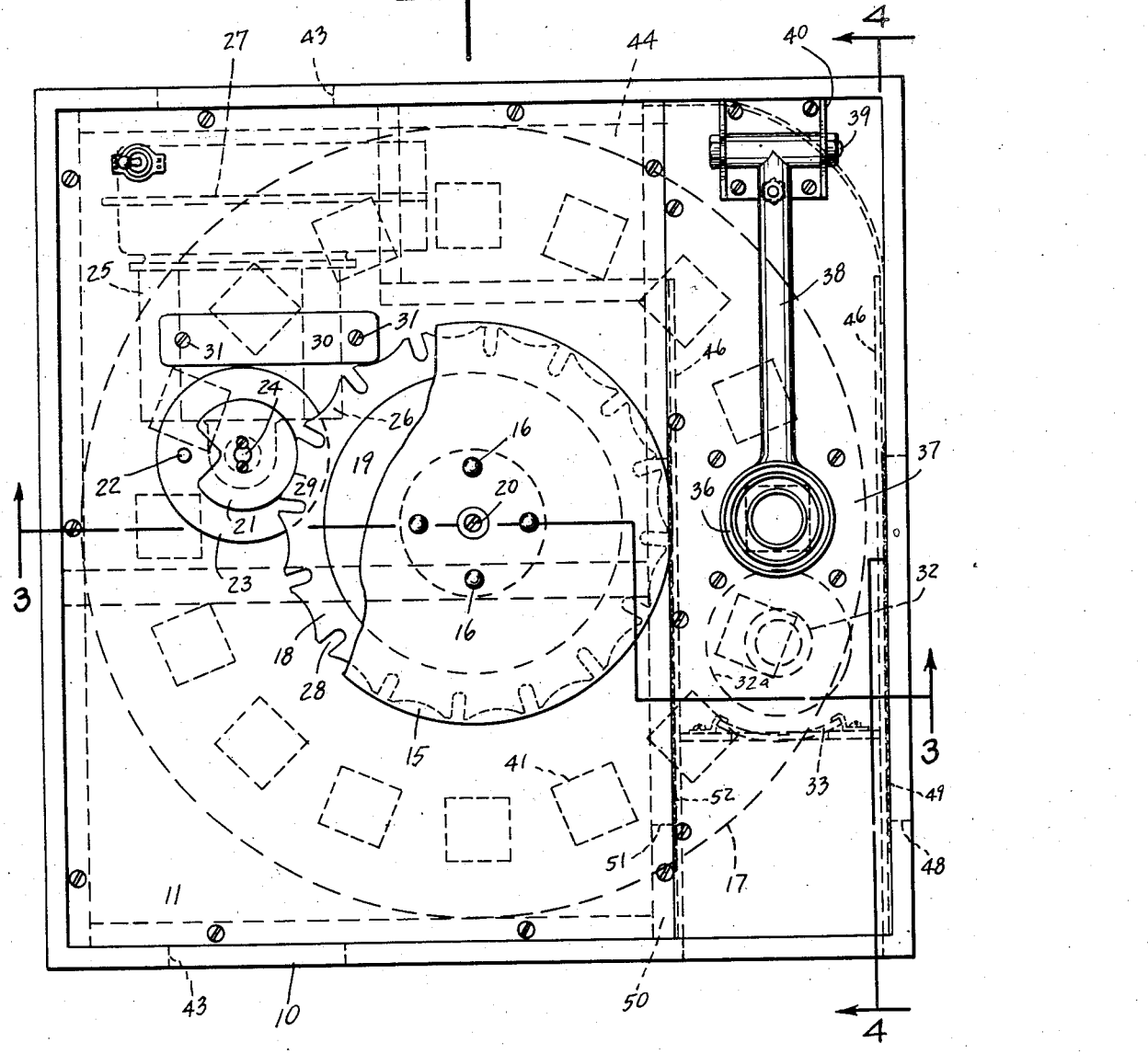

Aug. 13, 1946.　　G. E. MUSEBECK ET AL　　2,405,706
PICTURE PROJECTOR
Filed May 21, 1943　　3 Sheets-Sheet 3

INVENTORS.
GEORGE E. MUSEBECK.
FRANK P. BENNETT.
BY Lockwood, Goldsmith & Galt.
ATTORNEYS.

Patented Aug. 13, 1946

2,405,706

UNITED STATES PATENT OFFICE 2,405,706

PICTURE PROJECTOR

George E. Musebeck and Frank P. Bennett, Danville, Ill., assignor to Musebeck Shoe Company, Danville, Ill., a corporation Application May 21, 1943, Serial No. 487,912

3 Claims. (Cl. 88—27)

This invention relates to a machine for automatically projecting a series of still pictures on a screen, particularly applicable for advertising, promotion, training and educational service, and utilizing for that purpose an intermittently rotating disk picture record having a series of spaced pictures through which intense light is projected for reproduction thereof, said picture records being of the character disclosed in the Letters Patent of George E. Musebeck, No. 2,369,483, granted February 13, 1945, entitled "Picture projecting record."

The object of the invention is to enable a picture to be projected upon a screen through the medium of light rays of sufficient intensity to overcome the interference of normal illumination, lighting effects or daylight. Thus, it may be desirable to project the pictures onto a screen in a room or show window of a store in broad day light or with the lights on after dark, or to project a picture on an outdoor bill board or the wall of a building which will not be "resisted" by street lights. Thus, it is the purpose of this invention to produce a projector which may be conveniently employed at all times and irrespective of lighting conditions. By this means a series of advertising, promotion, training or educational pictures may be efficiently presented with sufficient intensity so that there is no interference with the screen image from such illumination.

Another feature of the invention resides in a turntable and driving mechanism for the picture record disk, whereby it will be periodically rotated from one picture frame to the next with a predetermined interval of rest for the showing of the framed picture, and wherein the picture record is so centered and capable of adjustment as to properly position the picture frame relative to the projecting aperture and lenses, and more particularly maintain the focal relation of the still pictures as each is registered with the projecting aperture. The maintenance of proper focusing is of importance as will be readily understood, since it depends upon the relative positions of each of the numerous pictures carried by the rotating disk in respect to the optical system of the projector.

The full nature of the invention will be understood from the following description and claims and the accompanying drawings:

Fig. 1 is a perspective view of the projector with a picture record mounted thereon in projecting position. Fig. 2 is a plan view showing parts broken away and with the record removed. Fig. 3 is a section taken on the line 3—3 of Fig. 2. Fig. 4 is a section taken on the line 4—4 of Fig. 2 with parts broken away.

In the drawings there is shown a picture projector including a housing 10 of box-like form, having a top plate 11 and bottom 12. Secured centrally to the top plate there is a bearing ring 13 having an annular aperture centrally positioned for receiving the bearing disk 14 rotatable within the ring and centered thereby upon which the turntable 15 is secured, the bearing disk being rotatably supported by the upper surface of the top plate 11 and centered in its rotation by said bearing ring. The turntable is provided with a series, there being four shown herein, of upwardly extending locking pins 16 adapted to extend through corresponding apertures provided in the picture record 17.

Said turntable is secured to the bearing disk 14 and to an intermediate star wheel 18 which is substantially coextensive therewith and spaced therefrom by the spacer disk 19, said turntable and the above-described associated parts being rotatably held to the top plate by a screw 20.

The turntable is intermittently rotated by a driving element which comprises a mutilated disk 21 and a pin 22 mounted upon a rotating disk 23. The rotating disk is keyed to a driving shaft 24 driven through reduction gears contained in a gear housing 25 which in turn is driven by the motor 26. Said motor has a direct driving connection with a blower 27. Thus, whereas the motor rotating at high speed directly drives the blower, the driving element is driven through the speed reduction of gears at a comparatively low speed. This arrangement is such that upon the rotation of the driving element the pin 22 thereof engages in the radial slots 28 of the star wheel 18, causing partial rotation thereof. Upon the pin 22 leaving the slot in which it has engaged, after imparting the partial rotation, the star wheel is held stationary through engagement of the mutilated disk 21 with the concentric surface of the recess 29. Thus, the disk 21 disengages the star wheel during engagement and partial rotation thereof by the pin 22. The motor, gear housing and blower are suspended from the top plate, being secured to the underside thereof by a strap 30 and screws 31.

Contained within the opposite side of the housing, there is a lamp 32 mounted in the socket 32a which comprises the source of light. This lamp may be of high wattage, ranging from 600 to 1000 watts. On one side thereof there is a reflector 33, and on the opposite side thereof there is an angularly disposed optical first surface mirror 34 arranged to receive the direct and reflected rays from the lamp and transmit them upwardly in a series of parallel rays through the lens 35 and optical head 36. The lens 35 is horizontally secured within an aperture of the cover plate 37. The optical head mounted in alignment therewith extends upwardly in spaced relation with said lens, being supported by an arm 38 pivoted at 39 on a bracket 40 secured to the cover plate 37. The picture record 17 is periodically rotated between the lens 35 and the optical head 36 to bring one of the pictures 41 in alignment therewith. The relative position of the optical head to the picture record and lens 35 is adjusted through the medium of the bearing screw 42, mounted in the arm and bearing on the cover plate. The optical head is provided with the usual series of lenses capable of focal adjustment, all of the well known character.

As the driving element is rotated, the turntable is intermittently moved from one position to another, by engagement of the pin 22 with slots 28 of the star wheel. Intermediate such movement, it is held stationary by the mutilated disk 21 engaging with the following recess 29 to positively maintain the picture 41 in alignment with the lens and optical head. The light rays projected from the lamp through the lens projects the picture carried by the disk to a screen or suitable surface, there being any desired light bending medium employed to direct the picture to the location of the screen, or as may be desired.

For the purpose of controlling the heat generated by the lamp 32, the housing 10 is provided with air intake apertures 43 through which air is drawn into the blower and discharged into the air conduit 44 and lamp compartment 45, said compartment being insulated from the outer wall of the housing and the interior thereof by the insulating liners 46. The compartment is only of sufficient width to receive the lamp, mirror and reflector, said mirror and reflector being so arranged as to baffle the air passing therethrough for circulation about the lamp before being discharged from the end of the compartment through the exhaust opening 47.

For further dissipating the heat generated by the lamp, the adjacent outer wall of the housing is cut away to provide an opening indicated at 48 over which a copper mesh screen wire 49 is mounted coextensive with the insulation, said wire being mounted between the insulation and the wall of the housing so that there is no direct contact therebetween. A substantial radiating surface is provided by the screen which is exposed to the air to effectively dissipate the heat penetrating the insulation. The cut away portion of the wall also prevents the burning or scorching of that part thereof close to the lamp. The same provision is made on the opposite side of the lamp wherein the partition wall 50 is cut away at 51 and protected by a sheet of copper wire 52 effective to dissipate the heat.

Since intense heat is generated by the light rays projected through the picture, and since there is no continuous movement thereof, it is necessary to protect it also. This is accomplished by mounting the pictures to be projected between a pair of glass disks which may comprise a structural part of the picture record or mounted on the turntable in association therewith as shown in said above mentioned Letters Patent. Preferably said glass disks are structurally stronger than ordinary glass, hence are able to stand great and rapid temperature changes without shattering. This glass serves as a protection to the picture film or slide, in that it acts as a heat radiator or dissipating medium. This radiation or dissipation is induced both thermally and mechanically. The glass immediately adjacent to the slide or film being projected is heated by light striking or passing through it. This heat is diffused very little into the surrounding area of glass because of the notably poor heat conductivity of glass. However, as the picture record revolves or moves to the next frame, the glass which has been heated as above is moved away from the heating effect of the light beam and into relatively cool air so that the heat which has been absorbed by the glass is dissipated into the air on both sides of the record. This process, of course, continues during the time that the picture record makes a complete revolution and is repeated with each successive frame that is projected. Thus, the heat is absorbed and dissipated thermally but is at the same time conducted away from the film aperture mechanically.

This arrangement of the glass disks forming a part of the picture record or associated therewith, gives full protection to the picture film or slide and the emulsion carried thereby, such as will prevent the burning or damaging thereof by the intense heat of the light rays passing therethrough while temporarily held stationary for projection.

The invention claimed is:

1. A picture projector comprising a housing, a rotatable turntable adapted to receive a picture record, means for periodically rotating said turntable, a centering ring carried by said housing, a centering bearing disk carried by and extending downwardly from said turntable adapted to rotate in centering relation with said ring, and a series of annularly disposed and spaced projections extending upwardly from said turntable adapted to extend through corresponding apertures in said picture record for imparting rotation thereto while maintaining the pictures carried thereby in focus when in projecting position.

2. A picture projector comprising a rotatable turntable adapted to carry a picture record having a series of spaced pictures positioned thereabout beyond the periphery of said turntable, means for periodically rotating said turntable to move one of said pictures into projecting position and maintain it in said position during a period of projection, a source of light mounted below said record having means for projecting light through the picture when in projecting position, an optical head movable into and out of alignment with said light rays and picture for projecting the same on a screen, an arm for supporting said head in aligned position over said record, a hinged support for said arm mounted beyond the periphery of said record whereby said arm and head may be swung to one side of said record for permitting removal and replacement thereof, and an adjustable member on said arm and support adjacent the hinged connection therebetween for adjusting said head relative to the plane of movement of said record.

3. A picture projector comprising a housing, a rotatable turntable adapted to receive a picture record, means for periodically rotating said turntable, a centering ring carried by said housing, a centering bearing disk carried by and extending downwardly from said turntable adapted to rotate in centering relation with said ring, and driving means extending between said turntable and picture record for imparting rotation thereto while maintaining the pictures carried thereby in focus when in projecting position.

GEORGE E. MUSEBECK.
FRANK P. BENNETT.